Aug. 12, 1969   F. A. E. PORSCHE ET AL   3,460,644
REAR ENGINE DRIVE PASSENGER MOTOR VEHICLES
Filed April 13, 1967   3 Sheets-Sheet 1

INVENTORS
Ferdinand Anton Ernst Porsche
Wolfgang Eyb their ATTORNEYS

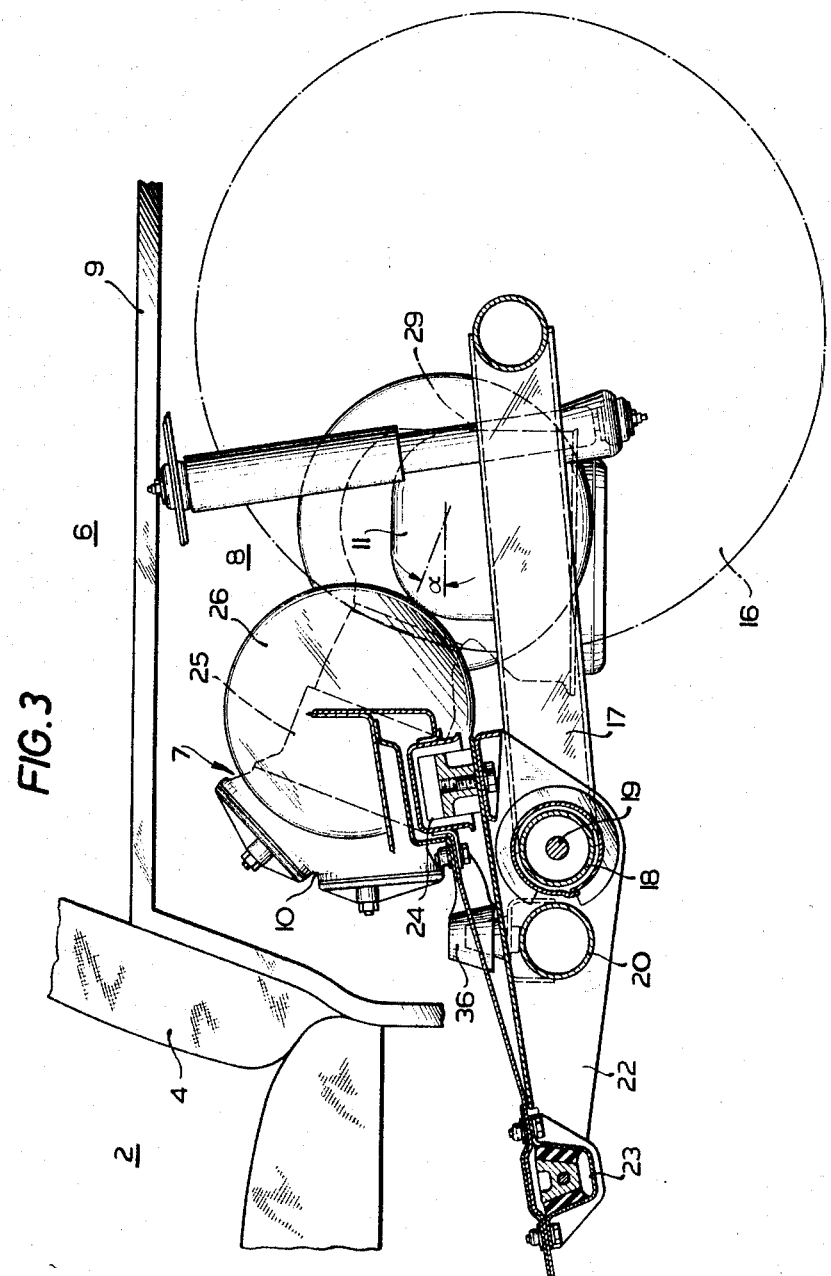

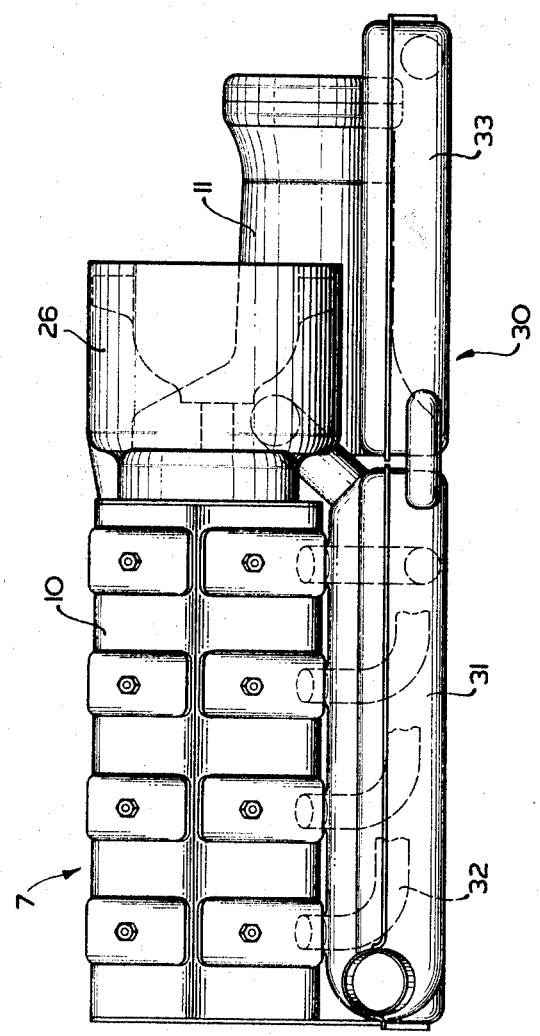

United States Patent Office  3,460,644
Patented Aug. 12, 1969

3,460,644
REAR ENGINE DRIVE PASSENGER MOTOR VEHICLES
Ferdinand Anton Ernst Porsche, Stuttgart-Nord, and Wolfgang Eyb, Leonberg, Germany, assignors to Dr. Ing. H. C. F. Porsche KG, Stuttgart-Zuffenhausen, Germany
Filed Apr. 13, 1967, Ser. No. 630,758
Claims priority, application Germany, May 6, 1966,
P 39,381, Patent P 1,580,530.8
Int. Cl. B60k 5/04, 5/12
U.S. Cl. 180—56                                13 Claims

ABSTRACT OF THE DISCLOSURE

A rear engine drive passenger motor vehicle having an internal combustion engine with its cylinders arranged in a row transverse to the longitudinal direction of the vehicle and change speed transmission generally transverse to the longitudinal direction of the vehicle. The engine and transmission are located forwardly of the rear axle with the cylinders pointing forwardly and upwardly at an acute angle with respect to the horizontal plane of the vehicle. The engine and transmission are located rearwardly of the rear seats and below a luggage compartment floor.

---

With motor vehicles having a rear engine drive comprising a change speed gear transmission and an internal combustion engine with its cylinders arranged in a row transverse to the longitudinal direction of the vehicle, the resulting center of gravity of the rear engine drive is quite high with respect to the remainder of the vehicle, which produces highly undesirable driving characteristics; also, such an arrangement has prevented the incorporation of rear trunk space.

The prior art constructions have mounted the internal combustion engine of a rear engine drive vehicle below the rear seat, which will produce a lower center of gravity with respect to the internal combustion engine and its transmission; however, this is highly disadvantageous in view of the space requirements, particularly because it would require the seating of the passengers at a considerable distance above the ground plane of the vehicle so that the passenger's center of gravity will be unfavorably high and again the total center of gravity of the vehicle will be undesirably high to adversely affect the driving characteristics. Also, such a construction would require a redesigning of the standard vehicle body to raise the roof and provide the necessary head room for the passengers in the rear seat.

Therefore, it is an object of the present invention to overcome the above-mentioned disadvantages by providing a rear engine drive wherein the passenger's center of gravity is relatively low and the center of gravity of the internal combustion engine with its transmission is relatively low to provide satisfactory driving characteristics.

According to the present invention, the rear engine drive comprising the internal combustion engine and transmission is located forwardly of the rear axle, behind the rear seat of the passenger compartment and immediately below the luggage compartment floor. The internal combustion engine is provided with a plurality of in line cylinders arranged in a row transverse to the longitudinal axis of the vehicle and inclined forwardly and upwardly at an acute angle with respect to the horizontal plane of the vehicle. By this means, the rear engine drive has a satisfactorily low center of gravity without adversely affecting the center of gravity of the passengers to be accommodated in the rear seat and the rear engine drive is accommodated within the wheel base in a compact manner. The rear seats may be constructed in a desirable conventional manner, because they are not adversely influenced by the mounting of the rear engine drive so that the low center of gravity of the passengers is insured. By this means, the driving characteristics of the passenger motor vehicle are considerably improved over that obtained with prior art rear engine drives and an easily accessible and spacious luggage compartment is additionally made available. It has been proven to be particularly advantageous to tilt the cylinders at an angle within the range of 15° to 30° with respect to the horizontal plane of the motor vehicle, as measured from the crankcase end of the cylinders forwardly and upwardly to the combustion chamber ends of the cylinders. With such a construction, the intake manifold and exhaust manifold, as well as other auxiliary equipment for the internal combustion engine may be arranged in a space-saving compact manner. The exhaust manifold is preferably mounted below the row of cylinders and the intake manifold is preferably mounted above the row of cylinders. Furthermore, a heat exchanger for air cooling the engine may be provided in conjunction with the exhaust manifold immediately below the row of cylinders adjacent to the change speed gear transmission. The bulky parts of the air intake, particularly the air intake filter, which are normally placed above the row of cylinders, are advantageously placed adjacent to the crankcase removed from the cylinders of the internal combustion engine in a space-saving manner according to the present invention. For further simplifying, and compacting the structure, the rear engine drive is attached to the vehicle body by means of a plurality of elastic supports, wherein at least one of the elastic supports is arranged on an auxiliary frame for the longitudinal wheel guiding elements that is in turn resiliently supported on the vehicle body. Particularly, the internal combustion engine is directly supported on a transverse bar support extending the entire width of the vehicle and provided at its opposite transverse ends with corresponding longitudinally extending support members that are fastened at their opposite ends to the vehicle body by means of elastic bearings.

Further objects, features, variations and embodiments of the present invention will become more clear with regard to the following detailed description of a preferred embodiment of the present invention, with the accompanying drawing wherein:

FIGURE 3 is an enlarged partial cross-sectional schematic view taken on line III—III of FIGURE 2; and FIGURE 4 is a partial schematic view of the rear engine drive taken in the direction of arrow R in FIGURE 2 and also on an enlarged scale.

Figure 1:
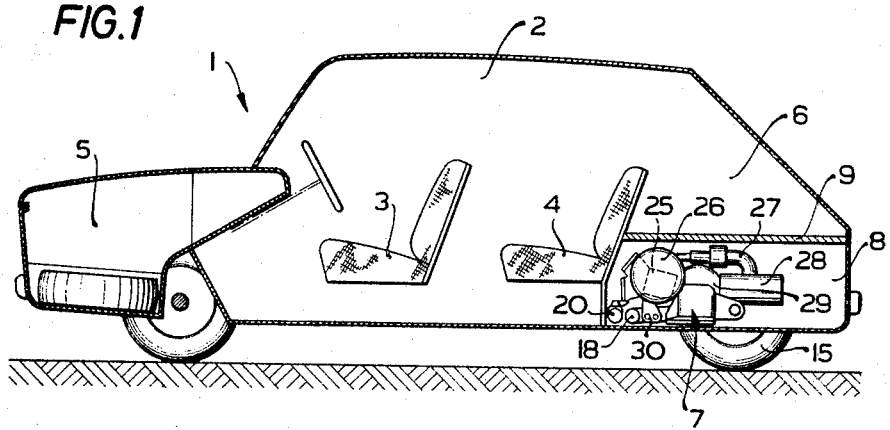
FIGURE 1 illustrates a schematic longitudinal cross-sectional view of a passenger motor vehicle having a rear engine drive mounted according to the present invention.

FIGURE 1 illustrates schematically a conventional passenger vehicle body 1 that has a passenger compartment 2 containing front seats 3 and rear seats 4. A front luggage compartment 5 is provided in the forwardmost portion of the vehicle and a rear luggage compartment 6 is provided in the rearmost portion of the vehicle.

Figure 2:
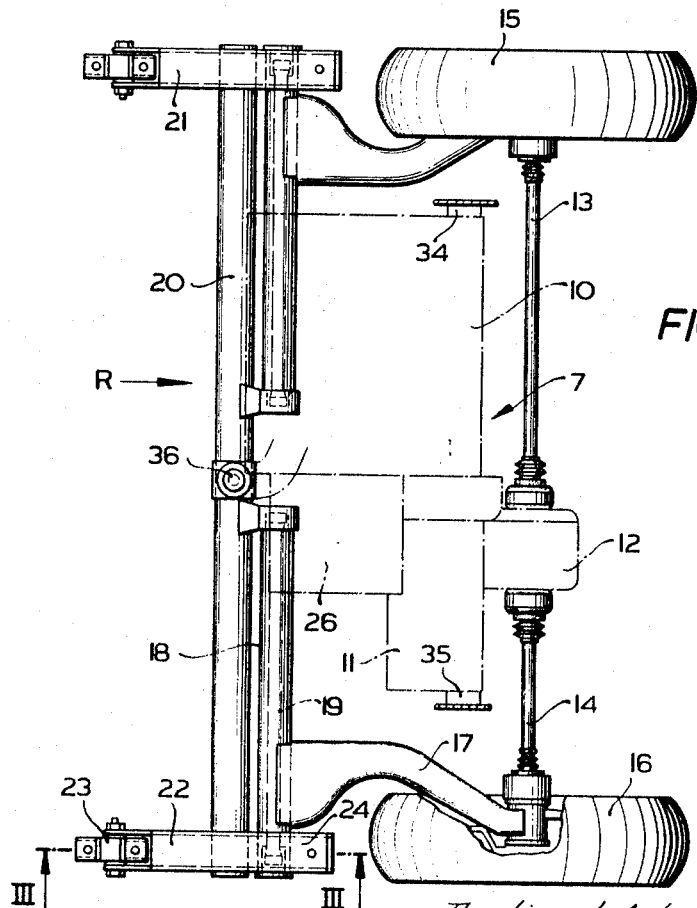
FIGURE 2 is a top plan cut away schematic view of the mechanism according to FIGURE 1, with portions removed.

The rear engine drive arrangement 7 is provided in a closed engine compartment 8 defined by the outer portions of the vehicle, the luggage compartment floor 9 and the rear portions of the rear seats 4, according to the present invention. The rear engine drive comprises an internal combustion engine 10, a change speed gear transmission 11 and a differential gear arrangement 12 all drivingly connected together. As shown particularly in FIGURE 2, the differential gear arrangement is drivingly connected with rear drive axles or shafts 13, 14, which are respectively drivingly connected to the rear wheels 15, 16. Each of the rear wheels 15, 16 is provided with a longitudinally extending wheel guide member 17 that is connected at its rear end to the wheel and connected at its forward end to a corresponding extension tube 18 that is mounted for rotation. Each of the tubes contains a corresponding torsion bar 19 connected at one end to its tube 18 and connected at its other end to a transverse support bar 20 so that the rear wheels 15 and 16 may independently pivot an axis defined by the coaxial axes of the tubes 18 and 19 to provide a rear independent spring suspension. The transverse support bar 20 is a part of an auxiliary frame and extends for substantially the entire width of the vehicle body. At the opposite transverse ends of the transverse support bar 20, there are respectively rigidly mounted longitudinal support members 21, 22 that each extend forwardly to where their forward ends are resiliently connected by means of two elastic bearings 23 to the vehicle body 24. One of the elastic bearings 23 is shown in cross-sectional detail in FIGURE 3 and comprises a rigid outer sheet metal housing forming a part of the vehicle body, a central rigid member having a support pin connecting it to the corresponding longitudinal support member, and elastic material on each side of the central rigid member to resiliently support the central rigid member with respect to the housing.

The rear engine drive 7 is accommodated between the wheel guide members 17. The internal combustion engine 10 has a plurality of cylinders 25 that are arranged in a single row transverse to the longitudinal direction of the vehicle. The cylinders 25 extend from their crankcase end forwardly and upwardly to their combustion chamber ends at a relatively small acute angle with respect to the horizontal plane of the vehicle. Particular advantageous results have been found to exist when this acute angle is within the range of 15 to 30 degrees with respect to the horizontal plane, most preferably 20 degrees. The cylinders 25 of the internal combustion engine 10 are air cooled by means of a blower 26.

The change speed gear transmission 11 is arranged as an extension of the internal combustion engine, that is, they have common rigidly interconnected housings, and in turn supports the differential gear arrangement 12 in a like manner. The intake manifold 27 of the internal combustion engine 10 (FIGURE 1) for supplying the intake air and fuel air mixture is preferably operatively mounted above the cylinders 25. The bulky parts of the engine auxiliary equipment, particularly the air intake filter 28, are arranged in the space behind the internal combustion engine 10 adjacent to the crankcase 29 and generally away from the cylinders 25, and preferably fastened to the crankcase housing.

The exhaust manifold 30 of the internal combustion engine 10 is mounted immediately below the cylinders 25 and consists of a heat exchanger 31 that is penetrated by and in heat exchange relationship with respect to the exhaust pipes 32 of the internal combustion engine. The exhaust muffler 33, into which the exhaust gases flow, is arranged as an extension of the heat exchanger 31 and mounted closely adjacent to the change speed gear transmission 11.

The rear engine drive 7 is elastically supported on the vehicle body of the passenger motor vehicle by means of resilient elastic bearings 34, 35, 36. The bearing 36 supports the internal combustion engine 10 on the transverse support bar 20, FIGURE 3. Engine vibrations are further dampened by means of the previously described elastic bearings 23, and 24 that support the auxiliary frame on the vehicle body. Only one of the bearings 23, 24 has been shown in cross-section, because they are of substantially identical construction. The bearing 23 is constructed so that it will be highly resilient with respect to the axis of the bearing, that is, in the vertical direction and relatively stiff in the horizontal direction. Bearing 24 is similarly constructed to be resilient in the vertical direction and relatively stiff with respect to movements in the horizontal plane. These bearings serve primarily to laterally guide the corresponding wheels in the internal combustion engine that are supported on the transverse support 19. The elastic bearing 36 for the support of the internal combustion engine 10 on the transverse support bar 20 is constructed and arranged in such a manner that it is relatively soft and highly resilient in the vertical direction and provides a relatively stiff hard support in any of the horizontal directions. By this means, vibrations from the internal combustion engine as well as from the auxiliary frame, are dampened in an advantageous manner. The above embodiments have been shown and described only as examples of the present invention; other modifications, embodiments and variations according to the broader aspects of the present invention are contemplated.

What is claimed is:

1. A passenger motor vehicle having a longitudinal driving direction comprising: a vehicle body including a passenger compartment having front seats and rear seats; a luggage compartment within said body rearwardly of said rear seats and having a floor; a rear axle drive comprising rear wheels, rear axle and differential gear arrangement; an internal combustion engine mounted beneath said luggage compartment floor and rearwardly of said rear seats and forwardly of said rear axle; said internal combustion engine having a plurality of cylinders arranged in a row perpendicular to the longitudinal direction of the vehicle; each of said cylinders having a crankshaft end and a combustion chamber end, and being mounted at an acute angle with respect to the normal horizontal plane of the vehicle with their combustion chamber ends being closer to said rear seats than said crankshaft ends; a change speed gear transmission drivingly connected between said internal combustion engine and said differential gear arrangement; said transmission being mounted beneath said luggage compartment floor rearwardly of said rear seats and forwardly of said rear axle; said internal combustion engine including an exhaust manifold mounted below said cylinders and an intake manifold mounted above said cylinders; an engine cooling heat exchanger mounted below said cylinders and in generally coaxial heat exchange relationship with said exhaust manifold closely adjacent to said change speed gear transmission.

2. The device of claim 1, wherein said cylinders are inclined upwardly and forwardly with respect to the horizontal plane of the vehicle at an angle within the range of 15 to 30 degrees.

3. The device of claim 2, wherein said internal combustion engine includes a crankcase and an intake air cleaner operatively connected to said intake manifold generally above said cylinders and rearwardly of said crankcase.

4. The device of claim 3, including an auxiliary frame having a support and being resiliently mounted to said body; longitudinal wheel guide means for suspending said rear wheels on said auxiliary frame for guided movement relative to said auxiliary frame; a plurality of elastic bearing means mounting said engine and transmission on said body and including at least one elastic bearing between said engine and transmission and said auxiliary frame.

5. The device of claim 4, wherein said support is a rigid elongated transverse bar; said auxiliary frame including two longitudinally extending rigid bar support members, each connected at its rear longitudinal end to a corresponding transverse end of said support bar; said elastic bearing means mounting the forward longitudinal ends of said support members on said body.

6. The device of claim 5, including at least two transversely extending torsion bars, each drivingly connected at its outer end to the forward end of a corresponding one of said longitudinal wheel guide means and connected at its inner end to said transverse support bar; said engine being mounted rearwardly of said transverse support bar and said torsion bars.

7. The device of claim 1, wherein said internal combustion engine includes a crankcase and an intake air cleaner operatively connected to said intake manifold generally above said cylinders and rearwardly of said crankcase.

8. A passenger motor vehicle having a longitudinal driving direction comprising: a vehicle body including a passenger compartment having front seats and rear seats; a luggage compartment within said body rearwardly of said rear seats and having a floor; a rear axle drive comprising rear wheels, rear axle and differential gear arrangement; an internal combustion engine mounted beneath said luggage compartment floor and rearwardly of said rear seats and forwardly of said rear axle; said internal combustion engine having a plurality of cylinders arranged in a row perpendicular to the longitudinal direction of the vehicle; each of said cylinders having a crankshaft end and a combustion chamber end, and being mounted at an acute angle with respect to the normal horizontal plane of the vehicle with their combustion chamber ends being closer to said rear seats than said crankshaft ends; a change speed gear transmission drivingly connected between said internal combustion engine and said differential gear arrangement; said transmission being mounted beneath said luggage compartment floor rearwardly of said rear seats and forwardly of said rear axle; said internal combustion engine including an exhaust manifold mounted below said cylinders and an intake manifold mounted above said cylinders; said internal combustion engine including a crankcase and an intake air cleaner operatively connected to said intake manifold generally above said cylinders and rearwardly of said crankcase.

9. The device of claim 8, including an auxiliary frame having a support and being resiliently mounted to said body; longitudinal wheel guide means for suspending said rear wheels on said auxiliary frame for guided movement relative to said auxiliary frame; a plurality of elastic bearing means mounting said engine and transmission on said body and including at least one elastic bearing between said engine and said transmission and said auxiliary frame.

10. A passenger motor vehicle, comprising: a vehicle body; a relatively rigid transverse auxiliary frame including a rigid elongated bar support extending substantially the entire width of said vehicle body; an internal combustion engine supportingly mounted on said transverse support; longitudinal rigid bar support members mounted at their rear ends respectively on each transverse end of said transverse support; an elastic bearing means resiliently mounting the forward ends of each of said support members on said body; at least two rear wheels; at least two longitudinal guide suspension members, each connected at its rear end to a corresponding one of said rear wheels; at least two transversely extending torsion bars, each connected at its outer end to the forward end of a corresponding one of said longitudinal guide suspension members and connected at its inner end to said transverse support; said engine being mounted generally between the axis of said rear wheels and said transverse support; means drivingly connecting said engine to said rear wheels.

11. A passenger motor vehicle having a longitudinal driving direction comprising: a vehicle body including a passenger compartment having front seats and rear seats; a luggage compartment within said body rearwardly of said rear seats and having a floor; a rear axle drive comprising rear wheels, rear axle and differential gear arrangement; an internal combustion engine mounted beneath said luggage compartment floor and rearwardly of said rear seats and forwardly of said rear axle; said internal combustion engine having a plurality of cylinders arranged in a row perpendicular to the longitudinal direction of the vehicle; each of said cylinders having a crankshaft end and a combustion chamber end, and being mounted at an acute angle with respect to the normal horizontal plane of the vehicle with their combustion chamber ends being closer to said rear seats than said crankshaft ends; a change speed gear transmission drivingly connected between said internal combustion engine and said differential gear arrangement; said transmission being mounted beneath said luggage compartment floor rearwardly of said rear seats and forwardly of said rear axle; an auxiliary frame having a support and being resiliently mounted to said body; longitudinal wheel guide means for suspending said rear wheels on said auxiliary frame for guided movement relative to said auxiliary frame; a plurality of elastic bearing means mounting said engine and transmission on said body and including at least one elastic bearing between said engine and transmission and said auxiliary frame.

12. The device of claim 11, wherein said support is a rigid elongated transverse bar; said auxiliary frame including two longitudinally extending rigid bar support members, each connected at its rear longitudinal end to a corresponding transverse end of said support bar; said elastic bearing means mounting the forward longitudinal ends of said support members on said body.

13. The device of claim 12, including at least two transversely extending torsion bars, each drivingly connected at its outer end to the forward end of a corresponding one of said longitudinal wheel guide means and connected at its inner end to said transverse support bar; said engine being mounted rearwardly of said transverse support bar and said torsion bars.

References Cited

UNITED STATES PATENTS

| 1,959,113 | 5/1934 | Sherman. | |
| 2,164,096 | 6/1939 | Tjaarda | 180—54 |
| 2,782,864 | 2/1957 | Fessia | 180—55 |
| 2,900,035 | 8/1959 | Porsche et al. | 180—57 |
| 2,938,591 | 5/1960 | Porsche | 180—54 |

FOREIGN PATENTS

| 1,163,708 | 4/1958 | France. |
| 1,276,190 | 10/1961 | France. |
| 544,748 | 4/1942 | Great Britain. |

BENJAMIN HERSH, Primary Examiner

MILTON L. SMITH, Assistant Examiner